United States Patent
Ma et al.

(10) Patent No.: US 11,032,858 B2
(45) Date of Patent: Jun. 8, 2021

(54) NETWORK ACCESS METHOD, TERMINAL, ACCESS NETWORK, AND CORE NETWORK

(71) Applicant: HUAWEI TECHNOLOGIES CO., LTD., Guangdong (CN)

(72) Inventors: Jingwang Ma, Shanghai (CN); Zhiming Li, Reading (GB)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/582,566

(22) Filed: Sep. 25, 2019

(65) Prior Publication Data
US 2020/0022193 A1 Jan. 16, 2020

Related U.S. Application Data

(63) Continuation of application No. PCT/CN2017/078432, filed on Mar. 28, 2017.

(51) Int. Cl.
| | |
|---|---|
| *H04W 76/10* | (2018.01) |
| *H04W 48/16* | (2009.01) |
| *H04W 48/18* | (2009.01) |
| *H04W 60/00* | (2009.01) |
| *H04W 4/06* | (2009.01) |
| *H04W 8/02* | (2009.01) |

(52) U.S. Cl.
CPC ............ *H04W 76/10* (2018.02); *H04W 4/06* (2013.01); *H04W 8/02* (2013.01); *H04W 48/16* (2013.01); *H04W 48/18* (2013.01); *H04W 60/00* (2013.01)

(58) Field of Classification Search
CPC ......... H04W 76/10; H04W 4/06; H04W 8/02; H04W 48/16; H04W 48/18; H04W 60/00; H04W 40/24; H04W 48/00
See application file for complete search history.

(56) References Cited

U.S. PATENT DOCUMENTS

| | | | |
|---|---|---|---|
| 2013/0166207 A1 | 6/2013 | Shao et al. | |
| 2016/0353367 A1 | 12/2016 | Vrzic et al. | |

(Continued)

FOREIGN PATENT DOCUMENTS

| | | | |
|---|---|---|---|
| CN | 102096602 A | 6/2011 | |
| CN | 103384550 A | 11/2013 | |

(Continued)

OTHER PUBLICATIONS

Nokia et al,"Merged Proposal for Network Slice Selection",SA WG2 Meeting #116,S2-164116, Jul. 11-15, 2016, Vienna, Austria, total 12 pages.

(Continued)

*Primary Examiner* — Marisol Figueroa
(74) *Attorney, Agent, or Firm* — Womble Bond Dickinson (US) LLP

(57) ABSTRACT

This disclosure relates to the technical field, and discloses a network access method, a terminal, an access network, and a core network. The terminal obtains, based on the network service identifier, the network slice type identifier corresponding to a service identifier, and then accesses the network slice based on the access mode corresponding to the network slice type, thereby avoiding unavailability of the service caused by a failure to correctly access the network slice and improving service quality.

16 Claims, 11 Drawing Sheets

(56) References Cited

U.S. PATENT DOCUMENTS

2017/0070892 A1* 3/2017 Song .................. H04L 41/042
2018/0262980 A1* 9/2018 Jeong ................. H04W 8/24
2019/0129649 A1    5/2019 Zhong

FOREIGN PATENT DOCUMENTS

| CN | 105630418 A | 6/2016 |
| CN | 106095586 A | 11/2016 |
| CN | 106201338 A | 12/2016 |
| CN | 106375987 A | 2/2017 |
| CN | 106412905 A | 2/2017 |

OTHER PUBLICATIONS

ZTE,"Clarification on Network Slicing in RAN",3GPP TSG RAN WG3 Meeting #92,R3-161106,Nanjing, China, May 23-27, 2016, total 5 pages.
Huawei et al,"Slice ID usage and clarification",SA WG2 Meeting #117,S2-165641, Oct. 17-21, 2016, Kaohsiung, Taiwan, total 3 pages.
3GPP TR 22.864 V0.3.0 (Feb. 2016), 3rd Generation Partnership Project; Technical Specification Group Services and System Aspects; Feasibility Study on New Services and Markets Technology Enablers—Network Operation; Stage 1 (Release 14). Feb. 2016. total 24 pages.
Huawei:"Key principles for Support of Network Slicing in RAN",3GPP DRAFT; R3-162461,Oct. 6, 2016,total 3 pages.
Huawei:"Support of Network Slice Discovery",3GPP DRAFT; R3-162462,Oct. 6, 2016,total 4 pages.

\* cited by examiner ns entirety.

NETWORK ACCESS METHOD, TERMINAL, ACCESS NETWORK, AND CORE NETWORK

CROSS-REFERENCE TO RELATED APPLICATIONS

This application is a continuation of International Application No. PCT/CN2017/078432, filed on Mar. 28, 2017, the disclosure of which is hereby incorporated by reference in its entirety.

TECHNICAL FIELD

This disclosure relates to the field of communications technologies, and in particular, to a network access method, a terminal, an access network, and a core network.

BACKGROUND

In a 5G (5th generation mobile communications technology) network scenario, a network may be divided into a plurality of network slices based on supported service scenarios and services, and a terminal may access a network slice to obtain a network service provided by the network slice. Based on network functions, network slices include a type-A network slices, a type-B network slice, and a type-C network slice. The type-A network slice has a dedicated access network and a dedicated core network, the type-B network slice has a common access network and a dedicated core network, and the type-C network slice has a common access network and a common core network. For the three types of network slices, an access mode of the terminal varies.

In a practical application, when an application in the terminal needs to obtain a network service due to a service requirement, the terminal randomly uses an access mode to initiate network access to a network slice that provides the network service. However, when the selected access mode does not correspond to the network slice, the terminal cannot access the network slice to obtain the service.

SUMMARY

To resolve a problem in the prior art, embodiments of this disclosure provide a network access method, a terminal, an access network, and a core network. The technical solutions are as follows.

According to a first aspect, a network access method is provided, including:

obtaining, by a terminal, a network service identifier of a requested network service; obtaining, by the terminal, access information based on the network service identifier, where the access information includes a network slice identifier and a network slice type identifier that correspond to the network service identifier; determining, by the terminal, based on the network slice type identifier, an access mode corresponding to a network slice type; and accessing, based on the access mode corresponding to the network slice type, a network slice corresponding to the network slice identifier.

In the solution illustrated in the embodiment of this disclosure, the terminal obtains, based on the network service identifier, the network slice type identifier corresponding to a service identifier, and then accesses the network slice based on the access mode corresponding to the network slice type, thereby avoiding unavailability of the service caused by a failure to correctly access the network slice, and improving service quality.

In one embodiment, the determining, based on the network slice type identifier, an access mode corresponding to a network slice type includes:

determining, by the terminal based on the network slice type identifier, that the access mode corresponding to the network slice type is to access, through a dedicated access network and a dedicated core network, the network slice corresponding to the network slice identifier; or determining, by the terminal based on the network slice type identifier, that the access mode corresponding to the network slice type is to access, through a common access network and a dedicated core network, the network slice corresponding to the network slice identifier; or determining, by the terminal based on the network slice type identifier, that the access mode corresponding to the network slice type is to access, through a common access network and a common core network, the network slice corresponding to the network slice identifier.

In the solution illustrated in an embodiment of this disclosure, a plurality of access modes are determined based on the network slice type identifier, so that more choices are available in accessing the network slice.

In one embodiment, if the access mode is to access, through a dedicated access network and a dedicated core network, the network slice corresponding to the network slice identifier, the access information further includes a dedicated access network identifier; and the accessing, based on the access mode corresponding to the network slice type, a network slice corresponding to the network slice identifier includes:

receiving, by the terminal, a broadcast message sent by at least one access network, where the broadcast message includes an access network identifier; determining, by the terminal, in the at least one access network identifier and based on the dedicated access network identifier, a dedicated access network identifier the same as the dedicated access network identifier; sending, by the terminal, a network connection request, where the network connection request includes the dedicated access network identifier; establishing, by the terminal, a network connection to a dedicated access network corresponding to the dedicated access network identifier; and sending, by the terminal, a network registration request to the dedicated access network, where the network registration request carries the network slice identifier and a user identifier, and the network registration request is used to request a first dedicated core network corresponding to the network slice identifier to perform network registration on a terminal based on the user identifier.

In one embodiment, if the access mode is to access, through a common access network and a dedicated core network, the network slice corresponding to the network slice identifier, the accessing, based on the access mode corresponding to the network slice type, a network slice corresponding to the network slice identifier includes:

establishing, by the terminal, a network connection to a first common access network; and sending, by the terminal, a network registration request to the first common access network, where the network registration request carries the network slice identifier and a user identifier, and the network registration request is used to request a second dedicated core network corresponding to the network slice identifier to perform network registration on a terminal based on the user identifier.

In one embodiment, if the access mode is to access, through a common access network and a common core network, the network slice corresponding to the network slice identifier, the access information further includes a network service type; and the accessing, based on the access mode corresponding to the network slice type, a network slice corresponding to the network slice identifier includes:

establishing, by the terminal, a network connection to a second common access network, and registering with the common core network; determining, by the terminal, a service request message; and sending, by the terminal, the service request message to the common core network through the second common access network, where the service request message carries the network slice identifier, and the service request message is used to request access to the network slice corresponding to the network slice identifier.

In the solution illustrated in an embodiment of this disclosure, based on the determined network slice type, the network slice is accessed by using the access mode corresponding to the network slice type, thereby improving a network access success rate, avoiding unavailability of the service caused by a failure to correctly access the network slice, and further improving service quality.

In one embodiment, the access information further includes roaming indication information; and before the accessing, based on the access mode corresponding to the network slice type, a network slice corresponding to the network slice identifier, the method further includes:

detecting, by the terminal, a current network status; and performing, if the current network status is a roaming state and the roaming indication information is to allow the terminal to roam, the operation of accessing, by the terminal based on the network slice type identifier by using an access mode corresponding to the network slice type, the network slice corresponding to the network slice identifier; or if the current network status is a non-roaming state, accessing, by the terminal based on the network slice type identifier by using an access mode corresponding to the network slice type, the network slice corresponding to the network slice identifier.

In the solution illustrated in an embodiment of this disclosure, before accessing the network slice, the terminal detects the current network status, thereby avoiding access operations performed due to failure to access the network slice caused by limitations of the terminal itself, and saving resources.

According to a second aspect, a network access method is provided, including:

establishing, by an access network, a network connection to a terminal; receiving, by the access network, a network registration request sent by the terminal, where the network registration request includes a network slice identifier and a user identifier; determining, by the access network, a core network corresponding to the network slice identifier; and sending, by the access network, the network registration request to the core network, where the network registration request is used to request the core network to perform network registration on the terminal based on the user identifier, so that the terminal accesses a network slice corresponding to the network slice identifier.

In the solution illustrated in an embodiment of this disclosure, after establishing the network connection to the terminal, the access network sends the network registration request to the core network, and the core network performs network registration on the terminal, thereby ensuring the terminal to access the network slice and improving a network access success rate.

In one embodiment, the establishing a network connection to a terminal includes:

sending, by the access network, a broadcast message to the terminal, where the broadcast message includes an access network identifier, and the broadcast message is used for the terminal to determine an access network; receiving a network connection request sent by the terminal, where the network connection request includes the access network identifier; and establishing, by the access network, the network connection to the terminal based on the network connection request.

In the solution illustrated in an embodiment of this disclosure, the access network sends the broadcast message to the terminal, so that the terminal can establish a network connection to the access network based on the broadcast message and it is possible for the terminal to access the network slice.

In one embodiment, the network connection request includes the network slice identifier, and after the establishing the network connection to the terminal, the method further includes:

configuring, by the access network, a network based on the network slice identifier, to provide a service corresponding to the network slice type to the terminal based on the configured network.

In the solution illustrated in an embodiment of this disclosure, network configuration is performed based on the network slice identifier, so that the service can be provided to the terminal quickly.

In one embodiment, the determining a core network corresponding to the network slice identifier includes:

sending, by the access network, a first query request to a slice selection function entity, where the first query request includes the network slice identifier; and receiving, by the access network, a core network address corresponding to the network slice identifier and sent by the slice selection function entity.

In the solution illustrated in an embodiment of this disclosure, the core network is determined by the slice selection function entity, thereby making the determined core network more accurate and further improving a network access success rate.

According to a third aspect, a network access method is provided, including:

sending, by an access network, a broadcast message to the terminal, where the broadcast message includes an access network identifier, and the broadcast message is used for the terminal to determine an access network; receiving a network connection request sent by the terminal, where the network connection request includes the access network identifier; and establishing, by the access network, the network connection to the terminal based on the network connection request.

In one embodiment, the method further includes: receiving, by the access network, a network registration request sent by the terminal, where the network registration request includes a network slice identifier and a user identifier; determining, by the access network, a first dedicated core network corresponding to the network slice identifier; and sending, by the access network, the network registration request to the first dedicated core network, where the network registration request is used to request the first dedicated core network to perform network registration on the terminal based on the user identifier, so that the terminal accesses a network slice corresponding to the network slice identifier.

In the solution illustrated in an embodiment of this disclosure, the access network sends the broadcast message to the terminal, so that the terminal can establish a network connection to the access network based on the broadcast message and it is possible for the terminal to access the network slice. In addition, after establishing the network connection to the terminal, the access network sends the network registration request to the core network, and the core network performs network registration on the terminal, thereby ensuring the terminal to access the network slice and improving a network access success rate.

In one embodiment, the network connection request includes the network slice identifier, and after the establishing the network connection to the terminal, the method further includes:

configuring, by the access network, a network based on the network slice identifier, to provide a service corresponding to the network slice type to the terminal based on the configured network.

In the solution illustrated in an embodiment of this disclosure, network configuration is performed based on the network slice identifier, so that the service can be provided to the terminal quickly.

According to a fourth aspect, a network access method is provided, including:

receiving, by a core network, a network registration request sent by an access network, where the network registration request includes a network slice identifier and a user identifier; determining, by the core network, a network slice corresponding to the network slice identifier; and performing, by the core network, network registration on a terminal based on the user identifier, so that the terminal can access the network slice.

In the solution illustrated in an embodiment of this disclosure, network registration is performed on the terminal after the network registration request is received, thereby enabling the terminal to smoothly access the network slice, and improving a network access success rate and service quality.

In one embodiment, the performing network registration on a terminal based on the user identifier includes:

obtaining, by the core network, subscription information of a user based on the user identifier; and performing, by the core network, network registration on the terminal when it is determined based on the subscription information of the user that the terminal is allowed to access the network slice corresponding to the network slice identifier.

In the solution illustrated in an embodiment of this disclosure, network registration is performed on the terminal based on the subscription information of the user, thereby further ensuring the terminal to access a correct network slice, and improving a network access success rate.

According to a fifth aspect, a network access method is provided, including:

receiving, by a core network, a network service request message sent by a common access network, where the service request message includes a network slice identifier and a user identifier; and determining, by the core network, a network slice corresponding to the network slice identifier, so that a terminal accesses the network slice.

In the solution illustrated in an embodiment of this disclosure, the network slice is determined based on the network service request message, thereby making the determined network slice more accurate and improving a network access success rate.

In one embodiment, the determining a network slice corresponding to the network slice identifier includes:

sending, by the core network, a second query request to a slice selection function entity, where the second query request includes the network slice identifier; and receiving, by the core network, a network slice address corresponding to the network slice identifier and sent by the slice selection function entity.

In the solution illustrated in an embodiment of this disclosure, the network slice is determined by the slice selection function entity, thereby improving accuracy of the determined network slice and further ensuring the terminal to smoothly access the network slice.

According to a sixth aspect, a terminal is provided, where the terminal has functions of performing the actions of the terminal described in the example of the network access method. The function may be implemented by hardware, or may be implemented by hardware executing corresponding software. The hardware or software includes one or more modules corresponding to the foregoing function.

In one embodiment, a structure of the terminal includes a processing unit and a communications unit. The processing unit is configured to support the terminal in performing a corresponding function in the foregoing methods. The communications unit is configured to support communication between the terminal and another device. The terminal may further include a storage unit, and the storage unit is configured to couple to the processing unit and store a necessary program instruction and data for the terminal. In an example, the processing unit may be a processor, the communications unit may be a transceiver, and the storage unit may be a memory.

In another embodiment, a structure of the terminal includes an identifier obtaining unit, an information obtaining unit, a determining unit, a network slice access unit, and a detection unit. Such units can perform corresponding functions in the example of the network access method. For details, refer to the detailed description in the method example, and no repeated description is given.

According to a seventh aspect, an access network is provided, where the access network has functions of performing the actions of the access network described in the example of the network access method. The functions may be implemented by hardware, or may be implemented by hardware executing corresponding software. The hardware or software includes one or more modules corresponding to the foregoing function.

In one embodiment, a structure of the access network includes a processing unit and a communications unit, where the processing unit is configured to support the access network in performing corresponding functions in the method. The communications unit is configured to support communication between the access network and other devices. The access network may further include a storage unit, and the storage unit is configured to couple to the processing unit and store a necessary program instruction and data of the access network. In an example, the processing unit may be a processor, the communications unit may be a transceiver, and the storage unit may be a memory.

In another embodiment, a structure of the access network includes a network connection unit, a receiving unit, a determining unit, and a sending unit. Such units can perform corresponding functions in the example of the network access method. For details, refer to the detailed description in the method example, and no repeated description is given.

According to an eighth aspect, an access network is provided, where the access network has functions of performing the actions of the access network described in the example of the network access method. The functions may be implemented by hardware, or may be implemented by hardware executing corresponding software. The hardware or software includes one or more modules corresponding to the foregoing function.

In one embodiment, a structure of the access network includes a processing unit and a communications unit, where the processing unit is configured to support the access network in performing corresponding functions in the method. The communications unit is configured to support communication between the access network and other devices. The access network may further include a storage unit, and the storage unit is configured to couple to the processing unit and store a necessary program instruction and data of the access network. In an example, the processing unit may be a processor, the communications unit may be a transceiver, and the storage unit may be a memory.

In another embodiment, a structure of the access network includes a sending unit, a receiving unit, and a network connection unit. Such units can perform corresponding functions in the example of the network access method. For details, refer to the detailed description in the method example, and no repeated description is given.

According to a ninth aspect, a core network is provided, where the core network has functions of performing the actions of the core network described in the example of the network access method. The function may be implemented by hardware, or may be implemented by hardware executing corresponding software. The hardware or software includes one or more modules corresponding to the foregoing function.

In one embodiment, a structure of the core network includes a processing unit and a communications unit, where the processing unit is configured to support the core network in performing corresponding functions in the method. The communications unit is configured to support communication between the core network and other devices. The core network may further include a storage unit, and the storage unit is configured to couple to the processing unit and store a necessary program instruction and data of the core network. In an example, the processing unit may be a processor, the communications unit may be a transceiver, and the storage unit may be a memory.

In another embodiment, a structure of the core network includes a receiving unit, a determining unit, and a network registration unit. Such units can perform corresponding functions in the example of the network access method. For details, refer to the detailed description in the method example, and no repeated description is given.

According to a tenth aspect, a core network is provided, where the core network has functions of performing the actions of the core network described in the example of the network access method. The functions may be implemented by hardware, or may be implemented by hardware executing corresponding software. The hardware or software includes one or more modules corresponding to the foregoing function.

In one embodiment, a structure of the core network includes a processing unit and a communications unit, where the processing unit is configured to support the core network in performing corresponding functions in the method. The communications unit is configured to support communication between the core network and other devices. The core network may include a storage unit, and the storage unit is configured to couple to the processing unit and store a necessary program instruction and data of the core network.

In an example, the processing unit may be a processor, the communications unit may be a transceiver, and the storage unit may be a memory.

In another embodiment, a structure of the core network includes a receiving unit and a determining unit. Such units can perform corresponding functions in the example of the network access method. For details, refer to the detailed description in the method example, and no repeated description is given.

According to an eleventh aspect, a network access system is provided. The system includes any one of the following network devices: the terminal described in the sixth aspect, the access network described in the seventh or eighth aspect, or the core network described in the ninth or tenth aspect. In another possible design, the system may further include other devices that interact with the terminal, the access network, or the core network in the solution provided in an embodiment of this disclosure.

According to a twelfth aspect, a computer-readable medium is provided, and is configured to store computer software instructions used by the terminal. The computer-readable medium includes a program designed for executing the sixth aspect.

According to a thirteenth aspect, a computer-readable storage medium is provided, and is configured to store computer software instructions used by interface devices of the access network. The computer-readable storage medium includes a program designed for executing the seventh or eighth aspect.

According to a fourteenth aspect, a computer-readable storage medium is provided, and is configured to store computer software instructions used by the core network. The computer-readable storage medium includes a program designed for executing the ninth or tenth aspect.

According to a fifteenth aspect, a computer program product that includes instructions is provided, and when the computer program product runs on a computer, the computer is enabled to execute the method in the foregoing aspects.

The technical solutions provided in the embodiments of this disclosure have the following beneficial effects:

Based on the network service identifier, the terminal obtains the access information that includes at least the network slice type identifier, and then accesses the network slice based on the access mode corresponding to the network slice type identifier, thereby avoiding unavailability of the service caused by a failure to correctly access the network slice and improving a network connection success rate and service quality.

DESCRIPTION OF EMBODIMENTS

Figure 1:
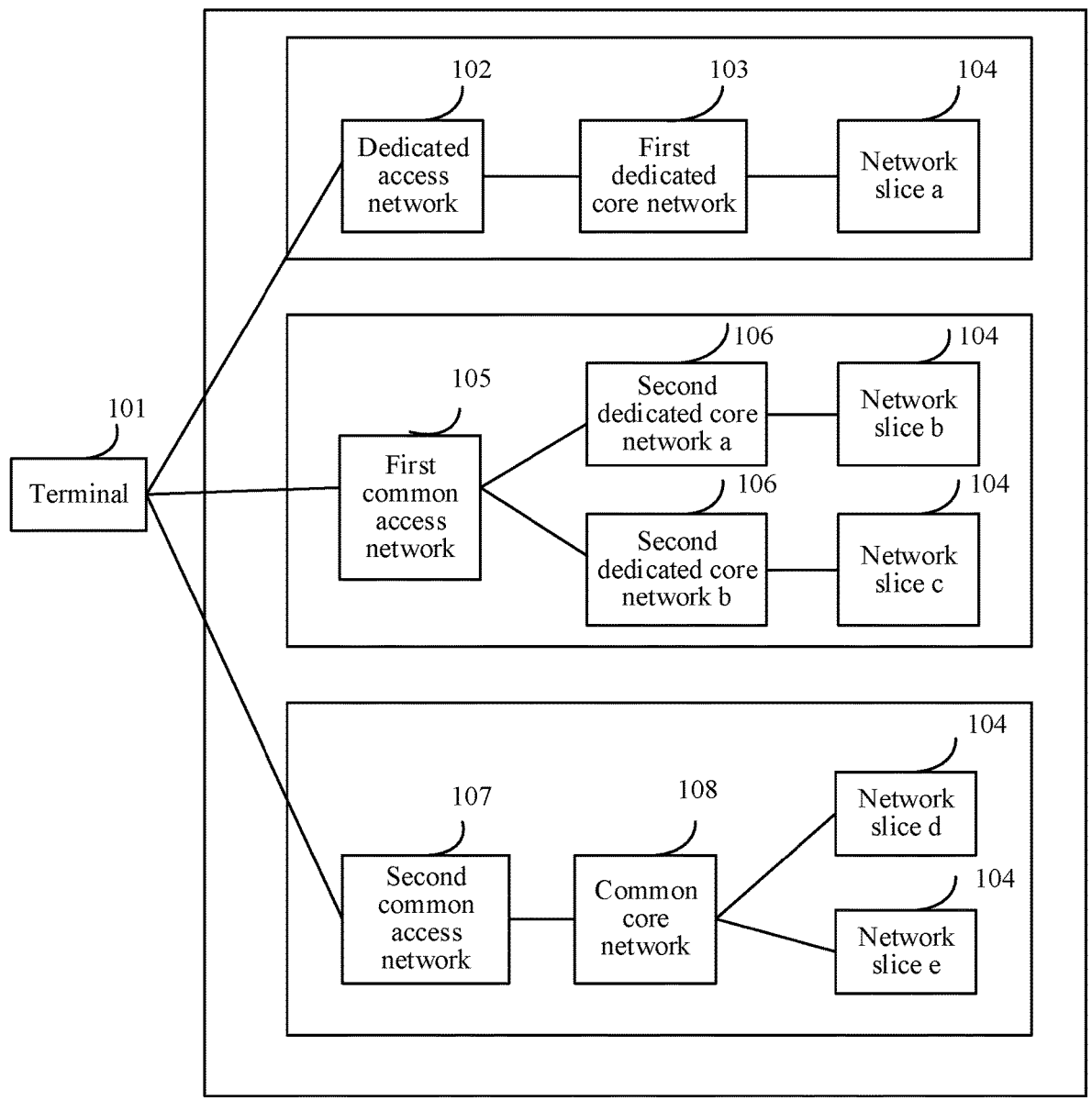
FIG. 1 is a schematic structural diagram of an implementation environment of a network access method according to an embodiment of this disclosure.

To make the objectives, technical solutions, and advantages of this disclosure clearer, the following further describes the implementation manners of this disclosure in detail with reference to the accompanying drawings.

A "module" mentioned in this specification is a program or an instruction that is stored in a memory and can implement some functions. A "unit" mentioned in this specification is a functional structure divided according to logic. The "unit" may be implemented by only hardware, or implemented by a combination of software and hardware.

With development of communications technologies, 5G network services will cover a plurality of application scenarios such as MBB (mobile broadband), V2V (vehicle to vehicle), MTC (machine type communication), and ITS (Intelligent Transfer System, or intelligent transport system). A conventional network architecture is a single-service user network, and can provide only one type of network service but cannot meet requirements of 5G services. To provide a plurality of network services in a same network system, a network in a 5G network system is divided into a plurality of network slices based on supported application scenarios, network services, and the like, and is constructed in a form of "customized function+generalized hardware". A network slice based on customized software allows an operator to provide the network as a service to users, and freely and flexibly combine network performance indicators such as rate, capacity, coverage, delay, reliability, security, and availability to meet requirements of 5G services.

In the 5G network system, by combining SDN (software defined network) and NHV (network function virtualization) technologies, the operator can provide customized network slices for different users on a same infrastructure. For example, the operator provides an MBB network slice for mobile bandwidth users, and provides an MTC network slice for machine type communication users, or the like. Based on network functions, network slices are classified into three types: a type-A network slice with a dedicated access network and a dedicated core networks, a type-B network slice with a common access network and a dedicated core network, and a type-C network slice with a common access network and a common core network. Access modes of different types of network slices are different.

For the type-A network slice, the terminal first accesses the dedicated access network of the network slice, and then sends a network registration request to the dedicated access network. The dedicated access network sends the network registration request to the dedicated core network. After the dedicated core network completes network registration, the terminal can access the network slice to use a network service provided by the network slice. For the type-B network slice, the terminal first accesses the common access network of the operator, and then sends a network registration request to the common access network. The common access network determines a dedicated core network based on a service required by the terminal, and sends the network registration request to the dedicated core network. After the dedicated core network completes the network registration, the terminal can access the network slice to use the network service provided by the network slice. For the type-C network slice, the terminal first accesses the common access network of the operator, and then sends a network registration request to the common access network. The common access network sends the network registration request to the common core network. After the common core network completes network registration and determines the network slice based on the network service required by the terminal, the terminal can access the network slice to use the network service provided by the network slice.

A 5G network architecture deployed by the operator generally includes the above three types of network slices, but the network services accessed by different applications in the terminal are provided by different types of network slices. For example, an application A needs to access the type-A network slice, and an application B needs to access the type-B network slice. Therefore, the terminal cannot access a corresponding network slice based on service requirements, and therefore, cannot obtain the required service.

To resolve the problem in the prior art, an embodiment of this disclosure provides a network access system. Referring to FIG. 1, the network access system includes: a terminal 101, a dedicated access network 102, a first dedicated core network 103, a network slice 104, a first common access network 105, a second dedicated core network 106, a second common access network 107, and a common core network 108.

The terminal 101 is a device with a communication function, and includes a mobile phone, a fixed phone, or the like. In the terminal 101, a security chip is disposed to store subscription information of a user. The security chip may be a SIM (subscriber identification module) card, an eSIM (embedded SIM) card, or the like. The dedicated access network 102 is an access network exclusively used by a network slice a104, the first dedicated core network 103 is a core network exclusively used by a network slice a104, the first common access network 105 is an access network shared by a plurality of network slices 104 including a network slice b and a network slice c, and the second common core network 106 is a core network shared by a plurality of network slices 104 including a network slice d and a network slice e.

For the type-A network slice, the dedicated access network 102 and the first dedicated core network 103 are in one-to-one correspondence. After the terminal accesses the dedicated access network 102, the dedicated access network 102 may access the first dedicated core network 103, and then access to the network slice a104. For the type-B network slice, the first common access network 105 corresponds to a plurality of second dedicated core networks 106 including the second dedicated core network a and the second dedicated core network b. Each second dedicated core network 106 corresponds to a network slice 104. For example, the second dedicated core network a corresponds to the network slice b, and the second dedicated core network b corresponds to the network slice c. For the C-type network slice, the second common access network 107 corresponds to the common core network 108, and each common core network corresponds to a plurality of network slices. For example, the second common core network 108 corresponds to a plurality of network slices including the network slice d and the network slice e.

Figure 2:
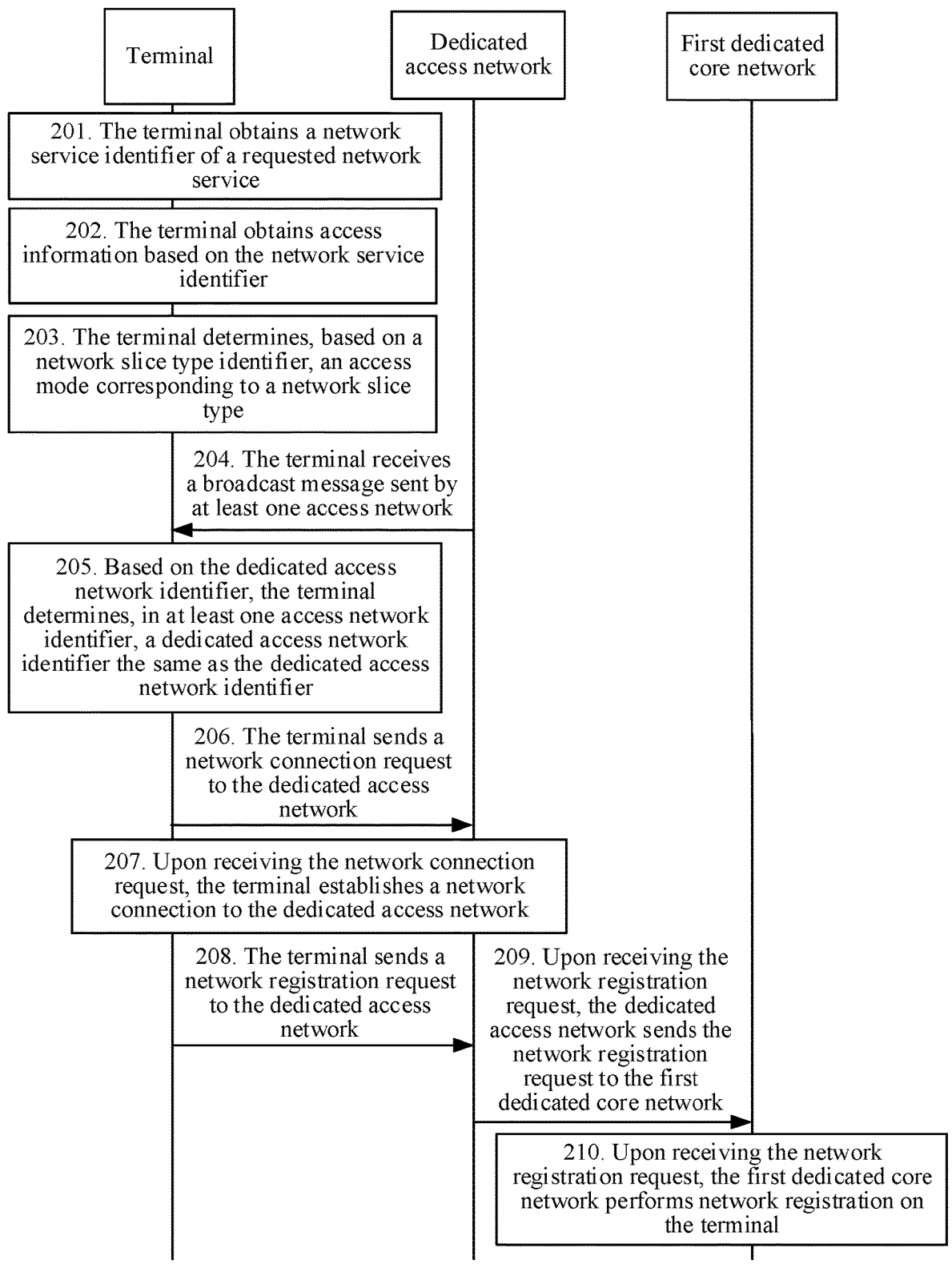
FIG. 2 is a flowchart of a network access method according to another embodiment of this disclosure.

An embodiment of this disclosure provides a network access method. The method is implemented based on the network access system shown in FIG. 1. As shown in FIG. 2, a procedure of the method provided in the embodiment of this disclosure includes the following operations.

Operation 201. A terminal obtains a network service identifier of a requested network service.

The network service identifier is used to identify a network service type supported by a network slice. Network service types include but are not limited to: a V2X (Vehicle to X, communication between a vehicle and the outside) type, a D2D (Device-to-Device, device-to-device communication) type, an MBB type (Mobile Broadband, mobile broadband), and an IoT type (Internet of Thing, Internet of things). A network slice that supports a network service type generally supports a plurality of network services of this network service type. For example, services supported by the MBB type include: a PDU session service and an SMS service.

In an embodiment of this disclosure, an application needs to obtain a network service due to service requirements in a running process, and the application may send a network service request to the terminal. The network service request carries at least a network service identifier. When receiving the network service request sent by the application, the terminal obtains, from the network service request, a network service identifier required by the application. The application is any application in the terminal, and may be a navigation application, a communication application, or a shopping application. Certainly, if the application needs only one type of network service, the terminal may store a correspondence between an application identifier and the network service identifier in a security chip. When the application needs to obtain the network service due to service requirements, the application may send a network service request to the terminal, where the network service request carries the application identifier. Based on the application identifier, the terminal may obtain a network service identifier corresponding to the application identifier from the security chip, where the network service identifier is the network service identifier of the network service requested by the application.

In another embodiment of this disclosure, when the terminal itself needs to access the network and obtain the network service, the terminal may determine the network service identifier based on the requested network service.

Operation 202. The terminal obtains access information based on the network service identifier.

In this embodiment, the terminal maintains a configuration information database, where the configuration information database is stored in the security chip, and the security chip may be a SIM card, an eSIM card, or the like. The configuration information database stores access information, and the access information is used for the terminal to access the network slice. The access information includes subscription information of a network slice allowed to be used. Further, the access information may further include public subscription information.

The public subscription information includes a user identifier, a key used for user authentication, an identifier of a network slice that the terminal accesses by default, or the like. The user identifier may be an IMSI (international mobile subscriber identification number) or the like. The key used for user authentication is a key generated by an operator when the user subscribes to a network service of the operator from the operator. The key is used to verify whether the user can access the network of the operator. The identifier of the network slice that the terminal accesses by default is an identifier of the network slice to be accessed by the terminal when the terminal receives no network service request sent by any application after the terminal is started.

The subscription information of the network slice allowed to be used varies depending on a type of the network slice. For the type-A network slice, the subscription information of the network slice allowed to be used includes a network slice identifier, a network slice type identifier, a network service identifier, and a dedicated access network identifier, and optionally, may further include roaming indication information. For the type-B network slice, the subscription information of the network slice allowed to be used includes a network slice identifier, a network slice type identifier, and a network service identifier, and optionally, may further include roaming indication information. For the type-C network slice, the subscription information of the network slice allowed to be used includes a network slice identifier, a network slice type identifier, and a network service identifier, and optionally, may further include roaming indication information and a network service type. The roaming indication information includes allowing the terminal to roam or not allowing the terminal to roam. The network service type is used to identify a network service supported by the network, including but not limited to, a PDU (protocol data unit) session, an SMS (short message service), or a location service.

In a 5G network scenario, each network slice is used to provide one type of network service, the network service available to the terminal may be determined by means of user subscription, and each type of network service has a network service identifier. Therefore, in other words, the configuration information database stores a correspondence among the network service identifier, the network slice identifier, and the network slice type identifier. Therefore, after obtaining the network service identifier, the terminal may obtain the access information corresponding to the network service identifier from the configuration information database.

In the field of communications technologies, each terminal has a home network. The home network is used to determine a current network status of the terminal, and can be identified by using a network identifier configured in the security chip of the terminal. The network identifier includes an MCC (mobile country code) and an MNC (mobile network code). The current network status of the terminal includes a roaming state, a non-roaming state, and the like. While the terminal is in use, the terminal may detect an MCC and an MNC that are broadcast by a local mobile network of the terminal. If the MCC and the MNC corresponding to the local network are different from the MCC and the MNC stored in the security chip of the terminal, it may be determined that the current network status is a roaming state; or if the MCC and the MNC corresponding to the local network are the same as the MCC and the MNC stored in the security chip of the terminal, it may be determined that the current network status is a non-roaming state. Whether the terminal can obtain the network service depends on the current network status and the roaming indication information. Specifically, the following cases may exist.

Case 1: If the current network status is a roaming state and the roaming indication information is to allow the terminal to roam, the terminal can obtain the network service from the network slice.

Case 2: If the current network status is a roaming state and the roaming indication information is not to allow the terminal to roam, the terminal does not perform the operation of accessing the network slice corresponding to the network identifier.

After determining that the network service is unavailable, the terminal may send prompt information to the application, where the prompt information is used to indicate that the application is unable to access the network slice.

Case 3: If the current network status is a non-roaming state, the terminal can obtain the network service from the network slice.

Operation 203. The terminal determines, based on a network slice type identifier, an access mode corresponding to a network slice type.

In the embodiment of this disclosure, the terminal determines, based on the network slice type identifier, that the access mode corresponding to the network slice type is to access, through the dedicated access network and the dedicated core network, the network slice corresponding to the network slice identifier, that is, determines that the access mode corresponding to the network slice type is to access the type-A network slice. Therefore, the terminal accesses, by using the access mode corresponding to the type-A network slice, the network slice corresponding to the network slice identifier. For an example embodiment of a process, refer to the following operations 204 to 210.

Operation 204. The terminal receives a broadcast message sent by at least one access network.

In a 5G network system, access networks are divided into two types. One type is a dedicated access network, and the other type is a common access network. The dedicated access network broadcasts a message in a system at preset intervals, where the message carries an access network identifier. Certainly, the common access network also broadcasts a message in the system at preset intervals, where the message carries the access network identifier and the like. For the common access network, the access network identifier may be an MCC, an MNC, or the like. The preset interval may be set as actually required, for example, 1 second, 2 seconds, or the like.

Operation 205. The terminal determines, in at least one access network identifier based on the dedicated access network identifier, a dedicated access network identifier being the same as the dedicated access network identifier.

When receiving the broadcast message sent by at least one access network including the dedicated access network and the common access network, the terminal determines, in at least one access network identifier based on the dedicated access network identifier in the access information, a dedicated access network identifier being the same as the dedicated access network identifier.

Operation 206. The terminal sends a network connection request to the dedicated access network.

When the dedicated access network identifier is determined, the terminal may send a network connection request to the dedicated access network corresponding to the dedicated access network identifier, where the network connection request carries at least the network slice identifier.

Operation 207. When receiving the network connection request, the terminal establishes a network connection to the dedicated access network.

Based on the network connection request, the dedicated access network establishes a network connection to the terminal, and configures a network based on the network slice identifier, to quickly provide a service corresponding to the network slice type to the terminal based on the configured network.

Operation 208. The terminal sends a network registration request to the dedicated access network.

After establishing the network connection to the dedicated access network, the terminal may send the network registration request to the dedicated access network based on the established network connection, where the network registration request carries at least the network slice identifier, the user identifier, and the like.

Operation 209. When receiving the network registration request, the dedicated access network sends the network registration request to a first dedicated core network.

For the type-A network slice, the dedicated access network corresponds to the first dedicated core network. When receiving the network registration request sent by the terminal, the dedicated access network may send the network registration request to the corresponding first dedicated core network.

Operation 210. When receiving the network registration request, the first dedicated core network performs network registration on the terminal.

In this embodiment, to facilitate subscription authentication on the terminal, a subscriber database is stored on a network side. The subscriber database stores subscription information of a plurality of users. When receiving the network registration request sent by the terminal, the first dedicated core network obtains subscription information of a user from the subscriber database based on the user identifier carried in the network registration request. If the subscription information of the user includes the network slice identifier carried in the network registration request, it may be determined that the terminal is allowed to access the network slice corresponding to the network slice identifier, and the first dedicated core network performs network registration on the terminal. The network registration includes performing authentication on the user and performing location registration on the terminal. When the first dedicated core network completes the network registration on the terminal, the terminal can access the network slice corresponding to the network slice identifier.

After completing the network registration on the terminal, the terminal may send a service request message to the network slice through the dedicated access network and the first dedicated core network, and then the network slice provides the requested network service for the terminal. Specifically, the terminal may determine the service request message based on the network service type requested by the application, where the service request message carries at least the user identifier. For example, if the network service type is a packet data connection, the terminal may determine that the service request message is a packet data establish request; or if the network service type is an SMS service, determine that the service request message is an SMS request. The terminal sends the service request message to the first dedicated core network through the dedicated access network, and the first dedicated core network further processes the service request, thereby completing the network service requested by the terminal.

Figure 3:
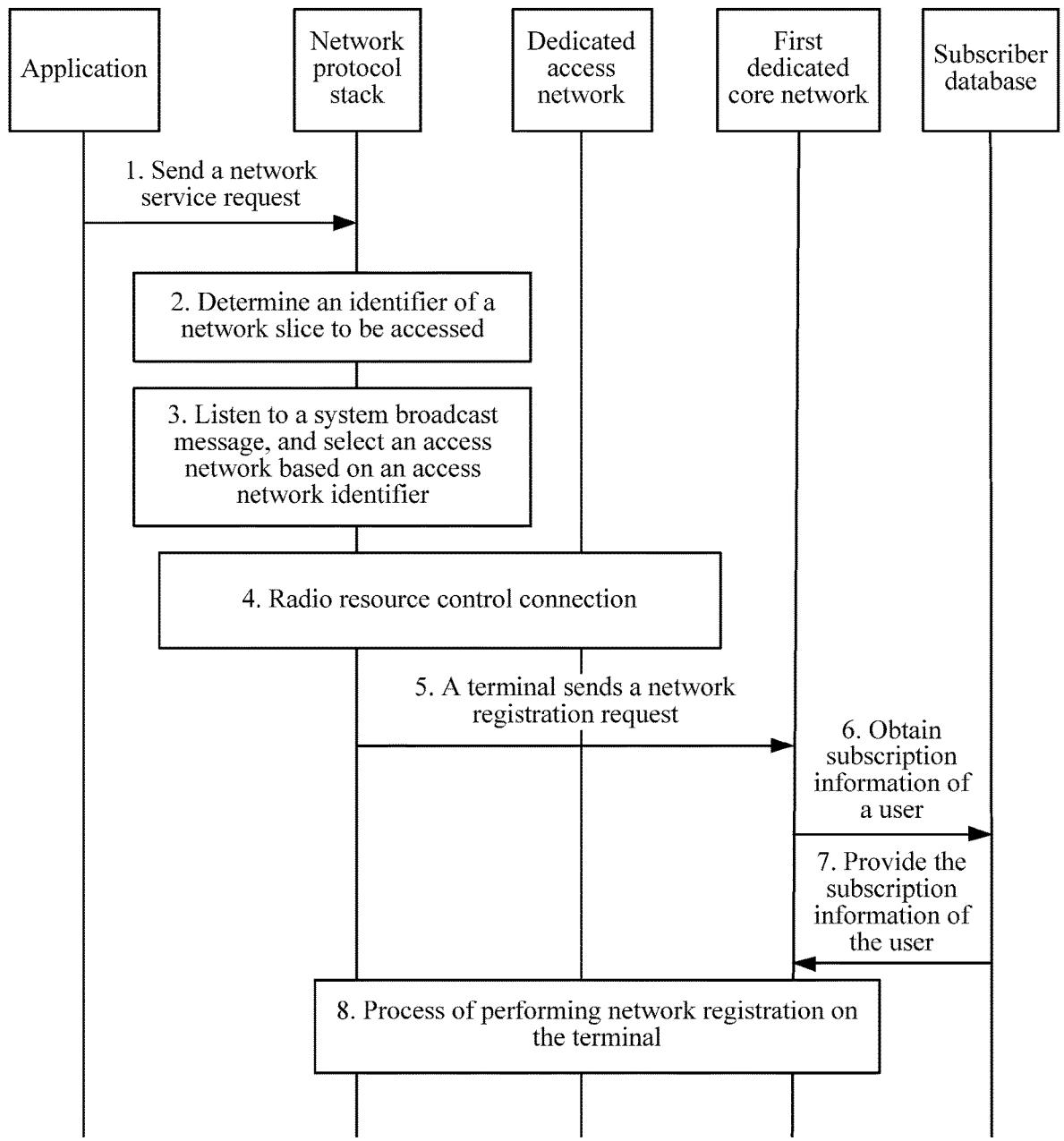
FIG. 3 is a schematic diagram of a network access process according to another embodiment of this disclosure.

For an embodiment of a process of accessing the type-A network slice by the terminal, refer to FIG. 3.

Referring to FIG. 3, due to service requirements, the application needs to obtain a network service in a running process. The application, according to one embodiment, may send a network service request to a network protocol stack in the terminal, where the network service request carries at least a network service identifier. Based on the network service identifier, the network protocol stack obtains access information from the configuration information database, where the access information carries the network service identifier, a network slice identifier, a dedicated access network identifier, a network slice type identifier, and the like. Based on the access information, the network protocol stack determines the identifier of the network slice to be accessed. The terminal receives in real time a broadcast message sent by a 5G network system, and establishes a connection to a dedicated access network corresponding to the dedicated access network identifier. Subsequently, the terminal sends a network registration request to the dedicated access network, where the network registration request carries at least a user identifier, the network slice identifier, and the like, and is sent by the dedicated access network to a first dedicated core network. When receiving the network registration request, the first dedicated core network obtains user subscription information corresponding to the user identifier from a subscriber database of a user. When it is determined based on the user subscription information that the terminal is allowed to access a network slice corresponding to the network slice identifier, the first dedicated core network performs network registration on the terminal. When completion of the network registration, the network slice provides a network service for the application in the terminal by performing a corresponding network service operation.

In the method provided in an embodiment of this disclosure, based on the network service identifier, the terminal obtains the access information that includes at least the network slice type identifier, and then accesses the network slice based on the access mode corresponding to the network slice type identifier, thereby avoiding unavailability of the service caused by a failure to correctly access the network slice and improving a network connection success rate and service quality.

Figure 4:
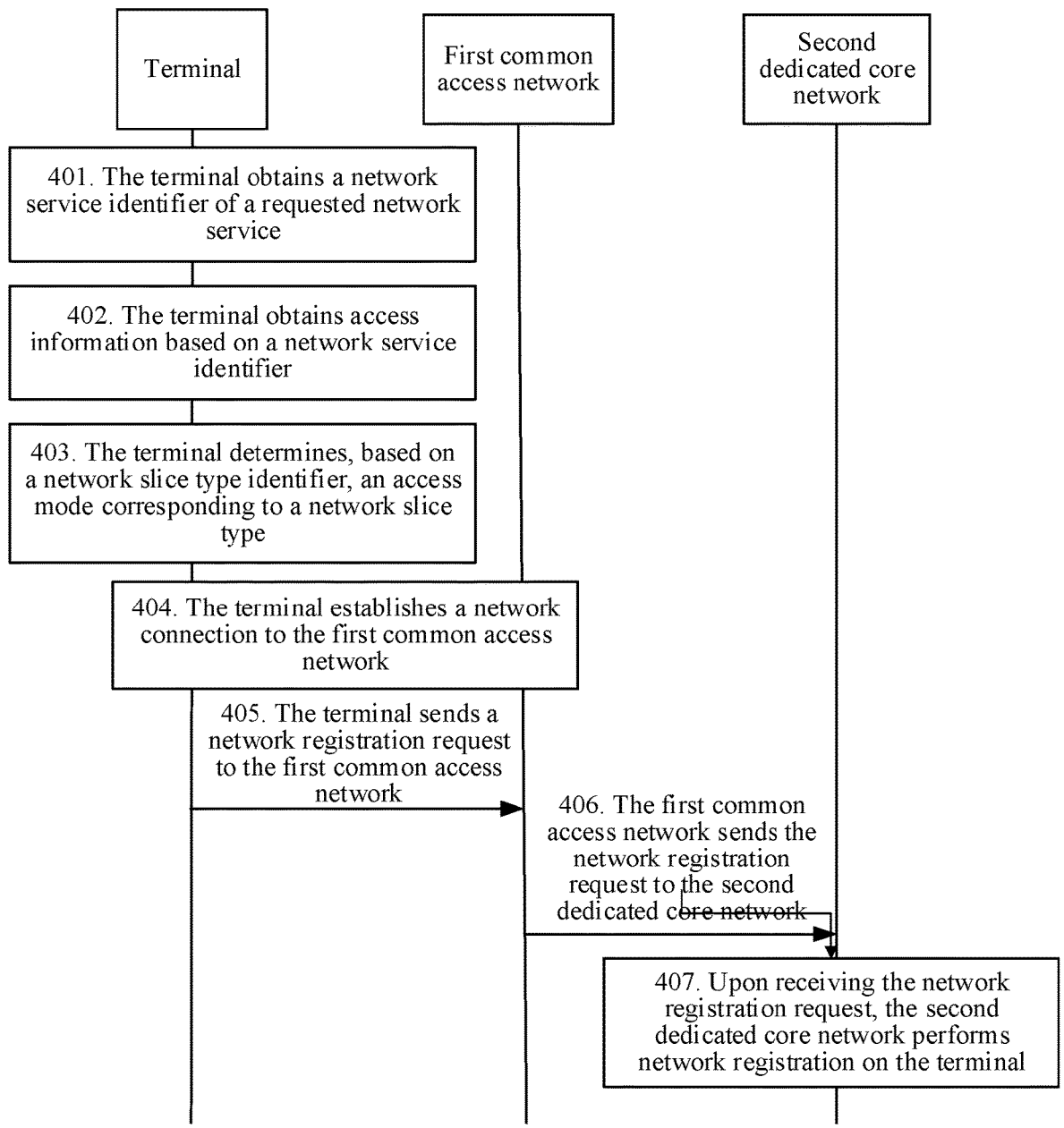
FIG. 4 is a flowchart of a network access method according to another embodiment of this disclosure.

An embodiment of this disclosure provides a network access method. The method is implemented based on the network access system shown in FIG. 1. As shown in FIG. 4, a procedure of the method provided in the embodiment of this disclosure includes the following operations.

Operation 401. A terminal obtains a network service identifier of a requested network service.

Detailed implementation of this operation is the same as that of operation 201 described above. For details, refer to operation 201, and no repeated description is given herein.

Operation 402. The terminal obtains access information based on the network service identifier.

Detailed implementation of this operation is the same as that of operation 202 described above. For details, refer to operation 202, and no repeated description is given herein.

Operation 403. The terminal determines, based on a network slice type identifier, an access mode corresponding to a network slice type.

In the embodiment of this disclosure, the terminal determines, based on the network slice type identifier, that the access mode corresponding to the network slice type is to access, through the first common access network and the second dedicated core network, a network slice corresponding to a network slice identifier, that is, determines that the access mode corresponding to the network slice type is to access a type-B network slice. Therefore, the terminal accesses, by using the access mode corresponding to the type-B network slice, the network slice corresponding to the network slice identifier. For a specific process, refer to the following operations 404 to 407.

Operation 404. The terminal establishes a network connection to a first common access network.

In this embodiment, a security chip of the terminal stores an MCC and an MNC, the MCC and the MNC may constitute a PLMN (public land mobile network), and the PLMN may be used to distinguish networks of different operators. Based on the MCC and the MNC that are obtained from the security chip, the terminal receives messages that are broadcast by the dedicated access network and the common access network in a 5G network system, and determines that an access network whose MCC and MNC are the same as those obtained from the security chip is the first common access network to be accessed. The terminal establishes a network connection to the first common access network by sending a network connection request to the first common access network.

Operation 405. The terminal sends a network registration request to the first common access network.

After establishing the network connection to the first common access network, the terminal may send the network registration request to the first common access network, where the network registration request carries at least the network slice identifier, a user identifier, and the like.

Operation 406. The first common access network sends the network registration request to a second dedicated core network.

For the type-B network slice, the first common access network corresponds to a plurality of second dedicated core networks. Each second dedicated core network corresponds to one network slice. To accurately select a second dedicated core network capable of providing a network service for the terminal, the common access network may determine, based on the network slice identifier and in the plurality of second dedicated core networks, a second dedicated core network that the terminal needs to access. Specifically, the first common access network sends a first query request to a slice selection function entity, where the first query request includes a network slice identifier. Based on the network slice identifier, the slice selection function entity determines a second dedicated core network to which the network slice corresponding to the network slice identifier belongs, and provides a network address of a function entity of the second dedicated core network to the first common access network. This process is actually equivalent to: providing the network address of the network function entity responsible for network registration in the second dedicated core network to the first common access network; and when receiving the network address of the network function entity responsible for network registration in the second dedicated core network, the first common access network can determine the second dedicated core network that the terminal needs to access. In another implementation, the first common access network stores the network slice identifier and configuration information of an address of a corresponding network function entity of the second dedicated core network. Based on the configuration information and the network slice identifier, the first common access network determines a network address of the network function entity responsible for network registration, and uses a second core network corresponding to the network address as a second dedicated core network that the terminal needs to access.

After determining the second dedicated core network that the terminal needs to access, the first common access network may send the network registration request to the second dedicated core network.

Operation 407. When receiving the network registration request, the second dedicated core network performs network registration on the terminal.

In this embodiment, to facilitate subscription authentication on the terminal, a subscriber database is stored on a network side. The subscriber database stores user subscription information the same as that in a configuration information database. When receiving the network registration request sent by the terminal, the second dedicated core network obtains subscription information of a user from the subscriber database based on the user identifier carried in the network registration request. If the subscription information of the user is the same as information carried in the network registration request, it may be determined that the terminal is allowed to access the network slice corresponding to the network slice identifier, and the second dedicated core network performs network registration on the terminal. The network registration includes performing authentication on the user, performing location registration on the terminal, and the like. When the second dedicated core network completes the network registration on the terminal, the terminal can access the network slice corresponding to the network slice identifier. Subsequently, the network slice can provide network services for the application in the terminal by performing corresponding network service operations, including: the terminal may determine the service request message based on the network service type requested by the application, where the service request message carries at least the user identifier. For example, if the network service type is a packet data connection, the terminal may determine that the service request message is a packet data establish request; or if the network service type is an SMS service, determine that the service request message is an SMS request. The terminal sends the service request message to the dedicated core network through the dedicated access network, and the second dedicated core network further processes the service request, thereby completing the network service requested by the terminal.

Figure 5:
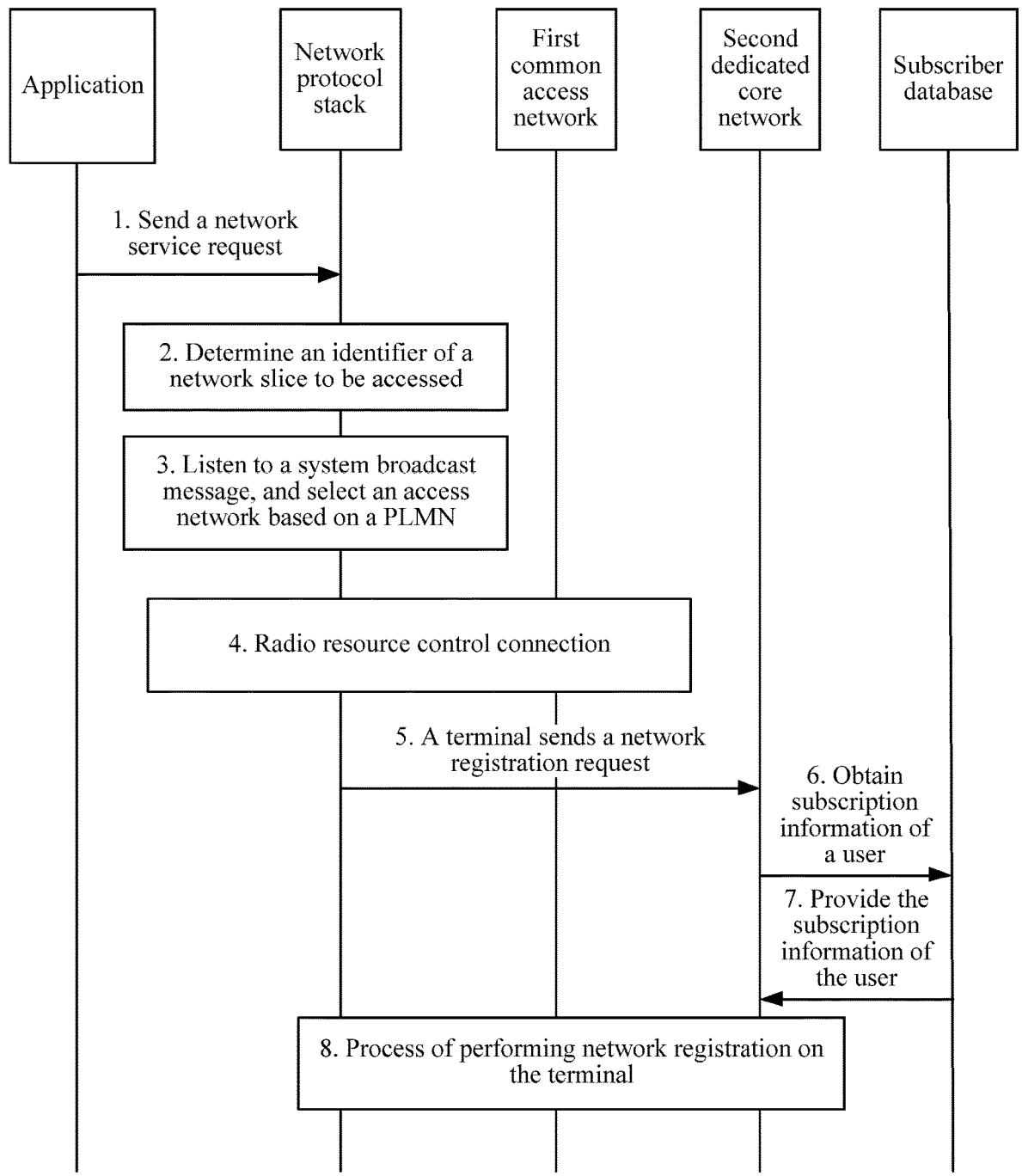
FIG. 5 is a schematic diagram of a network access process according to another embodiment of this disclosure.

For a process of accessing the type-B network slice by the terminal, refer to FIG. 5.

Referring to FIG. 5, due to service requirements, the application needs to obtain a network service in a running process. The application may send a network service request to a network protocol stack in the terminal, where the network service request carries at least a network service identifier. Based on the network service identifier, the network protocol stack determines a corresponding configuration information database. Based on the configuration information database, the terminal may obtain access information from the configuration information database, where the access information carries the network service identifier, the network slice identifier, the network slice type identifier, and the like. Based on the access information, the terminal determines an identifier of the network slice to be accessed. From the security chip, the terminal obtains the PLMN that includes the MCC and the MNC, and based on the broadcast message sent by the access network in the PLMN and the 5G network system, determines the first common access network to be accessed, and further establishes a network connection to the first common access network. Subsequently, the terminal sends a network registration request to the first common access network, where the network registration request carries at least a user identifier, the network slice identifier, and the like. Based on the network slice identifier, the first common access network determines a second dedicated core network, and sends the network registration request to the second dedicated core network. When receiving the network registration request, the second dedicated core network obtains user subscription information from a subscriber database of a user. When it is determined based on the user subscription information that the terminal is allowed to access a network slice corresponding to the network slice identifier, the second dedicated core network performs network registration on the terminal. When completion of the network registration, the terminal accesses the network slice. Subsequently, the network slice provides network services for the application in the terminal by performing corresponding network service operations.

In the method provided in the embodiment of this disclosure, based on the network service identifier, the terminal obtains the access information that includes at least the network slice type identifier, and then accesses the network slice based on the access mode corresponding to the network slice type identifier, thereby avoiding unavailability of the service caused by a failure to correctly access the network slice and improving a network connection success rate and service quality.

Figure 6:
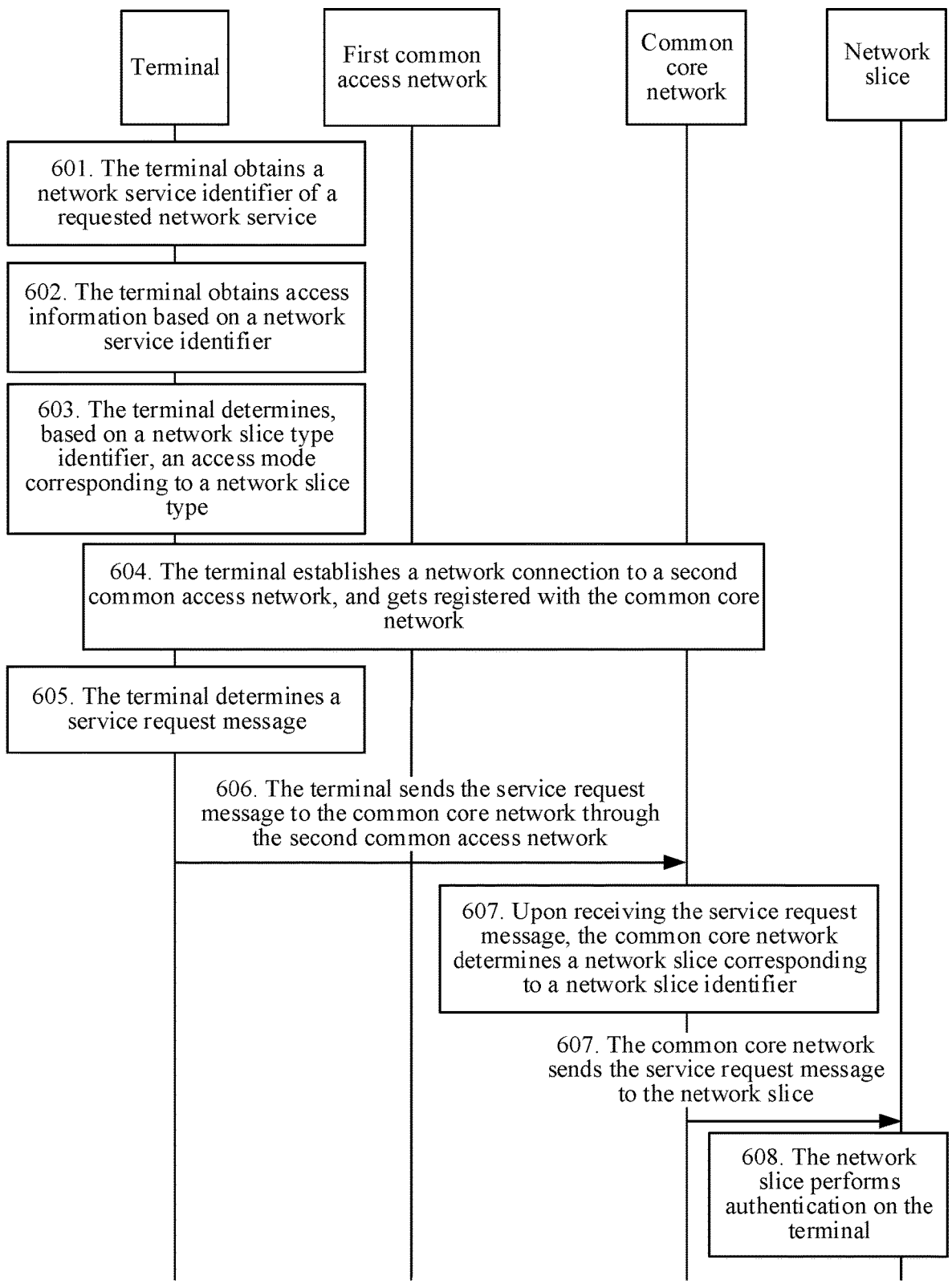
FIG. 6 is a flowchart of a network access method according to another embodiment of this disclosure.

An embodiment of this disclosure provides a network access method. The method is implemented based on the system shown in FIG. 1. As shown in FIG. 6, a procedure of the method provided in this embodiment includes the following operations.

Operation 601. A terminal obtains a network service identifier of a requested network service.

Detailed implementation of this operation is the same as that of operation 201 described above. For details, refer to operation 201, and no repeated description is given herein.

Operation 602. The terminal obtains access information based on the network service identifier.

Detailed implementation of this operation is the same as that of operation 202 described above. For details, refer to operation 202, and no repeated description is given herein.

Operation 603. The terminal determines, based on a network slice type identifier, an access mode corresponding to a network slice type.

In the embodiment of this disclosure, the terminal determines, based on the network slice type identifier, that the access mode corresponding to the network slice type is to access, through the common access network and the common core network, a network slice corresponding to a network slice identifier, that is, determines that the access mode corresponding to the network slice type is to access the type-C network slice. Therefore, the terminal accesses, by using the access mode corresponding to the type-C network slice, the network slice corresponding to the network slice identifier. For a specific process, refer to the following operations 604 to 608.

Operation 604. The terminal establishes a network connection to a second common access network, and gets registered with a common core network.

Detailed implementation of this operation is the same as operations 404 to 407 described above. For details, refer to operations 404 to 407, and no repeated description is given herein.

Operation 605. The terminal determines a service request message.

For the type-C network slice, after the common core network performs network registration on the terminal, the terminal determines the service request message based on the network service type, where the service request message carries at least a network slice identifier, a user identifier, and the like. Specifically, if the network service type is a packet data connection, it may be determined that the service request message is a packet data establish request; or if the network service type is an SMS service, it may be determined that the service request message is an SMS request.

Operation 606. The terminal sends the service request message to the common core network through the second common access network.

The service request message includes the network slice identifier, the user identifier, and the like.

Operation 607. When receiving the service request message, the common core network determines a network slice corresponding to a network slice identifier, and sends the service request message to the network slice.

When receiving the service request message, a common core network control plane (Common CN (core network) CP (mobile data service content provider)) sends a second query request to a slice selection function entity. The second query request includes the network slice identifier. When receiving the second query request, the slice selection function entity determines, based on the network slice identifier, a network slice corresponding to the network slice identifier, and sends an address of the network slice to the common core network control plane CN CP. The core network control plane CN CP uses the network slice corresponding to the address of the network slice as a network slice that the terminal needs to access, and sends the service request message to the network slice.

Operation 608. When receiving the service request message, the network slice performs authentication on the terminal.

When receiving the service request message, the network slice obtains the subscription information of the user from a subscriber database (or Subscriber data) based on the user identifier. After it is determined based on the subscription information of the user that the terminal is authenticated successfully, the network slice provides the terminal with desired services.

Figure 7:
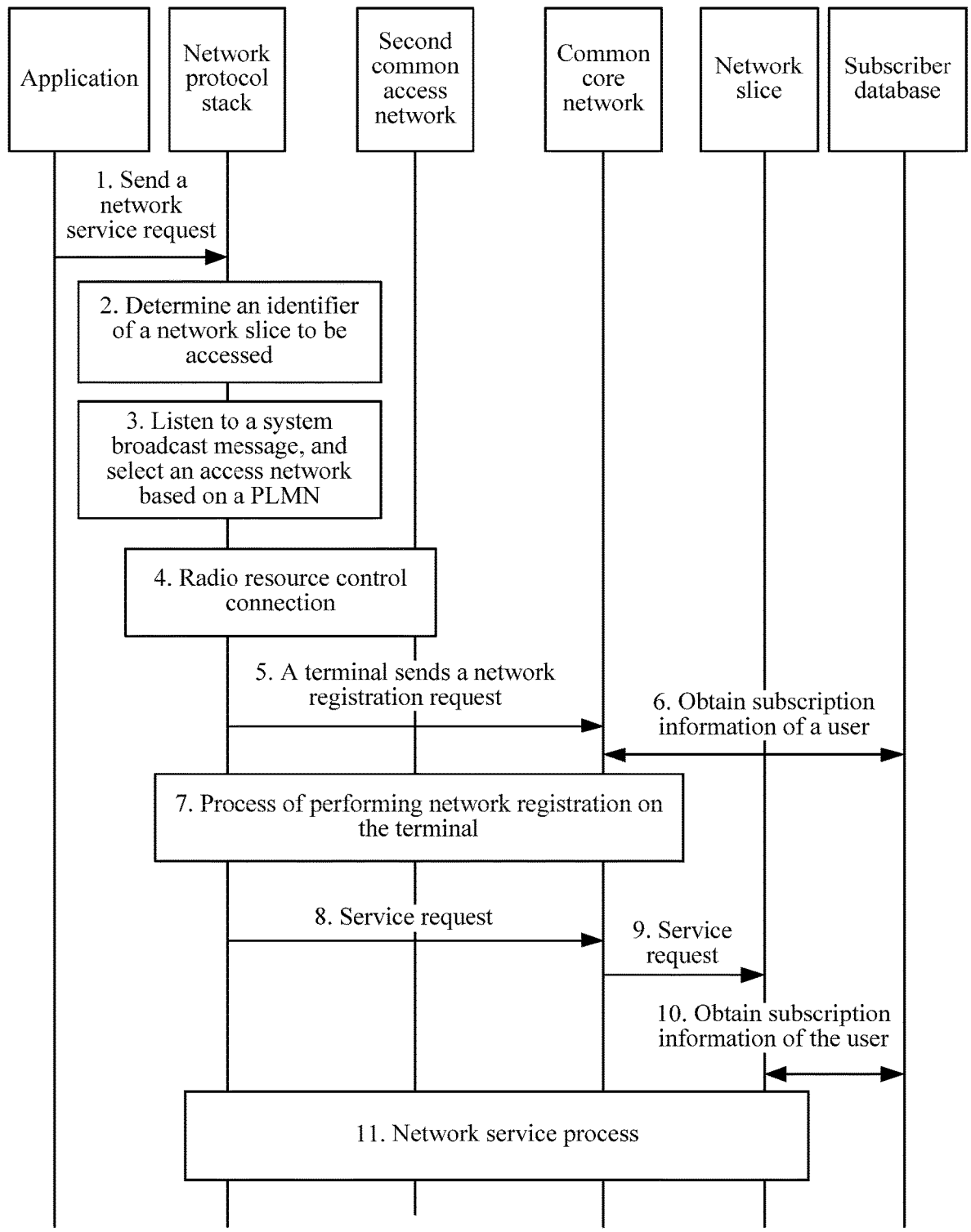
FIG. 7 is a schematic diagram of a network access process according to another embodiment of this disclosure.

For an embodiment of a process of accessing the type-C network slice by the terminal, refer to FIG. 7.

Referring to FIG. 7, due to service requirements, the application needs to obtain a network service in a running process. The application according to one embodiment may send a network service request to a network protocol stack in the terminal, where the network service request carries at least a network service identifier. Based on the network service identifier, the network protocol stack determines a corresponding configuration information database. The terminal obtains access information from the configuration information database, where the access information carries the network service identifier, the network slice identifier, the network slice type identifier, and the like. Based on the access information, the terminal determines an identifier of a network slice that needs to be accessed. From the security chip, the terminal obtains the PLMN that includes the MCC and the MNC, and based on the broadcast message sent by the access network in the PLMN and the 5G network system, determines the second common access network to be accessed, and further establishes a network connection to the second common access network. Subsequently, the terminal sends a network registration request to the second common access network, and the second common access network sends the network registration request to the common core network. When receiving the network registration request, the common core network obtains the user subscription information from subscriber database of the user. When it is determined based on the user subscription information that the terminal is allowed to access the network slice corresponding to the network slice identifier, the common core network performs network registration on the terminal. When completion of the network registration, the terminal sends a service request message to the common access network, where the service request message carries at least the network slice identifier, the user identifier, and the like. The common access network sends the service request message to the common core network, and the common core network determines, based on the network slice identifier, the network slice corresponding to the network slice identifier, and sends the service request message to the network slice. The network slice performs authentication on the user based on the subscriber database. After the authentication succeeds, the network slice can provide the terminal with desired services.

In the method provided in the embodiment of this disclosure, based on the network service identifier, the terminal obtains the access information that includes at least the network slice type identifier, and then accesses the network slice based on the access mode corresponding to the network slice type identifier, thereby avoiding unavailability of the service caused by a failure to correctly access the network slice and improving a network connection success rate and service quality.

Figure 8:
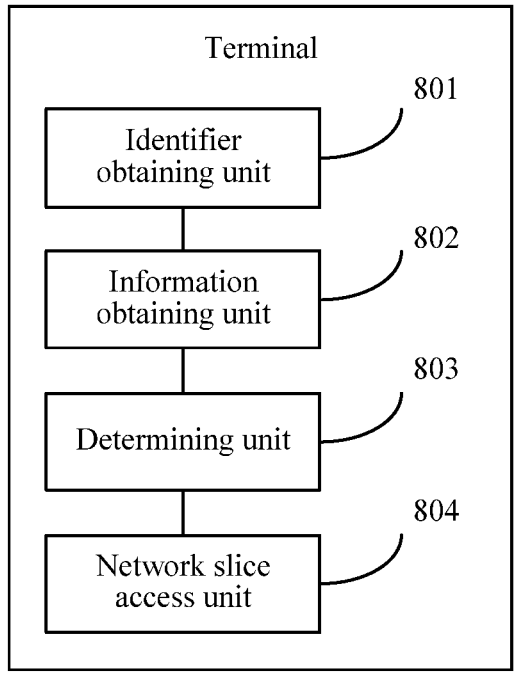
FIG. 8 is a schematic structural diagram of a terminal according to another embodiment of this disclosure.

FIG. 8 is a possible schematic structural diagram of a terminal according to one embodiment. Terminal can implement functions of the terminal described in the embodiment shown in FIG. 2 or FIG. 4 or FIG. 6.

Referring to FIG. 8, the terminal 800 includes: an identifier obtaining unit 801, an information obtaining unit 802, a determining unit 803, a network slice access unit 804, and a detection unit 805. Such units may be configured to perform corresponding functions in the foregoing examples of the network access method. For example, the identifier obtaining unit 801 is configured to obtain a network service identifier of a requested network service; the information obtaining unit 802 is configured to obtain access information based on the network service identifier; the determining unit 803 is configured to determine, based on the network slice type identifier, an access mode corresponding to a network slice type; and the network slice access unit 804 is configured to access, based on the access mode corresponding to the network slice type, the network slice corresponding to the network slice identifier.

Further, the determining unit 803 is further configured to determine, based on the network slice type identifier, that the access mode corresponding to the network slice type is to access, through the dedicated access network and the dedicated core network, the network slice corresponding to the network slice identifier; or the determining unit 803 is further configured to determine, based on the network slice type identifier, that the access mode corresponding to the network slice type is to access, through the common access network and the dedicated core network, the network slice corresponding to the network slice identifier; or the determining unit 803 is further configured to determine, based on the network slice type identifier, that the access mode corresponding to the network slice type is to access, through the common access network and the common core network, the network slice corresponding to the network slice identifier.

Further, the network slice access unit 804 is further configured to: when the access mode is to access, through the dedicated access network and the dedicated core network, the network slice corresponding to the network slice identifier, and when the access information further includes a dedicated access network identifier, receive a broadcast message sent by at least one access network; determine, in the at least one access network identifier based on the dedicated access network identifier, a dedicated access network identifier the same as the dedicated access network identifier; send a network connection request; establish a network connection to the dedicated access network corresponding to the dedicated access network identifier; and send a network registration request to the dedicated access network.

Further, the network slice access unit 804 is further configured to: when the access mode is to access, through the common access network and the dedicated core network, the network slice corresponding to the network slice identifier, establish a network connection to a first common access network; and send the network registration request to the first common access network.

Further, the network slice access unit 804 is further configured to: when the access mode is to access, through the common access network and the common core network, the network slice corresponding to the network slice identifier, and when the access information further includes a network service type, establish a network connection to a second common access network; get registered with the common core network; determine a service request message; and send the service request message to the common core network through the second common access network.

Further, the terminal 800 further includes a detection unit 805, configured to detect a current network status.

Figure 9:
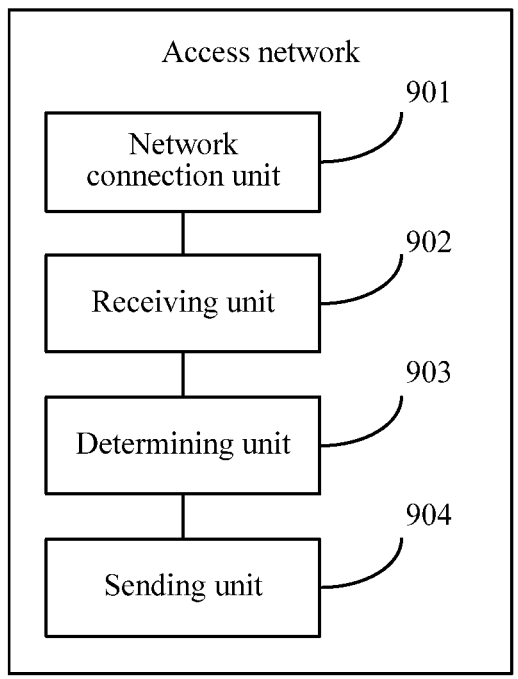
FIG. 9 is a schematic structural diagram of an access network according to another embodiment of this disclosure.

FIG. 9 is a possible schematic structural diagram of an access network according to one embodiment. The access network can implement functions of the access network described in the embodiment shown in FIG. 4 or FIG. 6.

Referring to FIG. 9, the access network 900 includes a network connection unit 901, a receiving unit 902, a determining unit 903, and a sending unit 904. Such units may be configured to perform corresponding functions in the foregoing examples of the network access method. For example, the network connection unit 901 is configured to establish a network connection to a terminal; the receiving unit 902 is configured to receive a network registration request sent by the terminal; the determining unit 903 is configured to determine a core network corresponding to a network slice identifier; and the sending unit 904 is configured to send the network registration request to the core network.

Further, the determining unit 903 is configured to send a first query request to a slice selection function entity, and receive a core network address corresponding to the network slice identifier and sent by the slice selection function entity.

Figure 10:
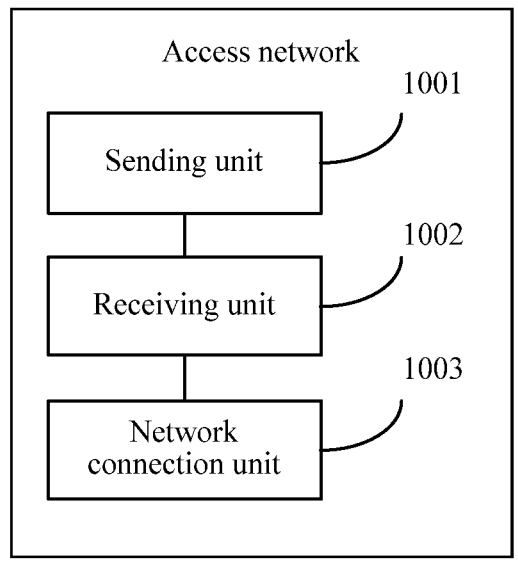
FIG. 10 is a schematic structural diagram of an access network according to another embodiment of this disclosure.

FIG. 10 is a possible schematic structural diagram of an access network according to one embodiment. The access network can implement functions of the access network described in the embodiment shown in FIG. 2.

Referring to FIG. 10, the access network 1000 includes a sending unit 1001, a receiving unit 1002, and a network connection unit 1003. Such units may be configured to perform corresponding functions in the foregoing examples of a network access method. For example, the sending unit 1001 is configured to send a broadcast message to a terminal; the receiving unit 1002 is configured to receive a network connection request sent by the terminal; and the network connection unit 1003 is configured to establish a network connection to the terminal based on the network connection request.

Figure 11:
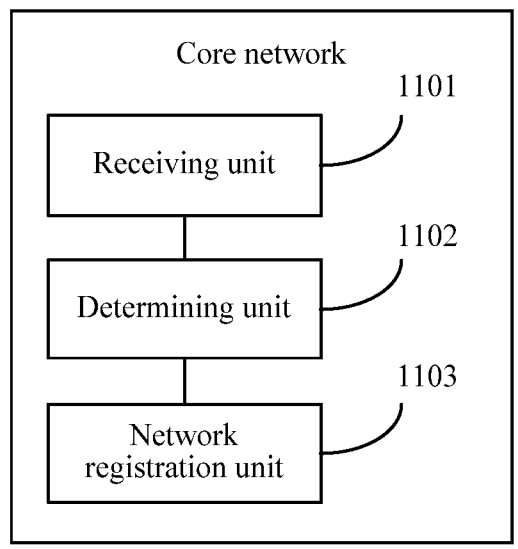
FIG. 11 is a schematic structural diagram of a core network according to another embodiment of this disclosure.

FIG. 11 is a possible schematic structural diagram of a core network according to one embodiment. The core network can implement functions of the core network described in the embodiment shown in FIG. 2 or FIG. 4.

Referring to FIG. 11, the core network 1100 includes a receiving unit 1101, a determining unit 1102, and a network registration unit 1003. The receiving unit 1101 is configured to receive a network registration request sent by an access network. The determining unit 1102 is configured to determine a network slice corresponding to a network slice identifier. The network registration unit 1103 is configured to perform network registration on a terminal based on a user identifier, so that the terminal can access the network slice.

Further, the network registration unit 1103 is further configured to: obtain subscription information of a user based on the user identifier; and perform network registration on the terminal when it is determined based on the subscription information of the user that the terminal is allowed to access the network slice corresponding to the network slice identifier.

Figure 12:
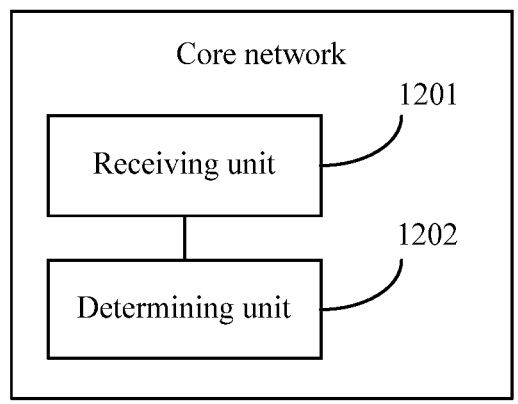
FIG. 12 is a schematic structural diagram of a core network according to another embodiment of this disclosure.

FIG. 12 is a possible schematic structural diagram of a core network according to one embodiment. The core network can implement functions of the core network described in the embodiment shown in FIG. 6.

Referring to FIG. 12, the core network 1200 includes a receiving unit 1201 and a determining unit 1202. The receiving unit 1201 is configured to receive a network service request message sent by a common access network; and the determining unit 1202 is configured to determine a network slice corresponding to a network slice identifier, so that the terminal accesses the network slice.

Further, the determining unit 1202 is configured to send a second query request to a slice selection function entity, and receive a network slice address corresponding to the network slice identifier and sent by the slice selection function entity.

It should be noted that, in this embodiment, unit division is exemplary, and is merely a logical function division. In actual implementation, another division manner may be used. Functional units in this embodiment of this disclosure may be integrated into one processing unit, or each of the units may exist alone physically, or two or more units are integrated into one unit. The integrated unit may be implemented in a form of hardware, or may be implemented in a form of a software functional unit.

Figure 13:
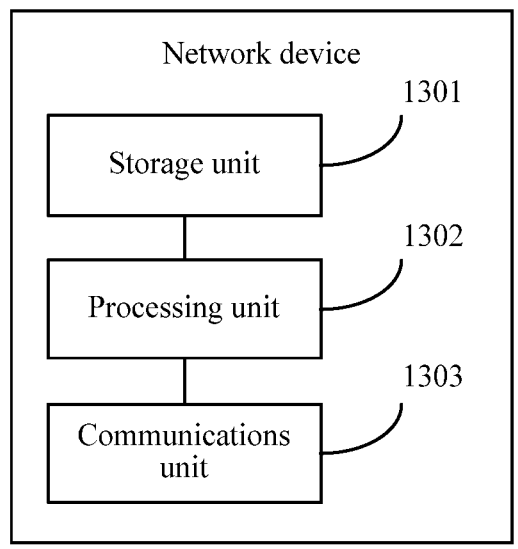
FIG. 13 is a schematic structural diagram of a network device according to another embodiment of this disclosure.

When integrated units are applied, FIG. 13 is another possible schematic structural diagram of a network device 1300 according to one embodiment. The network device includes: a storage unit 1301, a processing unit 1302, and a communications unit 1303. The storage unit 1301 is configured to store program code and data of the network device 1300. The network device 1300 may be a terminal, an access network, or a core network.

When the network device 1300 is a terminal, the network device 1300 can also implement the functions of the terminal 800 shown in FIG. 2 or FIG. 4 or FIG. 6. The processing unit 1302 is configured to perform control and management on actions of the terminal 800. For example, the processing unit 1302 is configured to support the terminal in performing operations 201 to 206 and 208 in FIG. 2, operations 401 to 405 in FIG. 4, and operations 601 to 603, 605, and 606 in FIG. 6, and/or is applied to other processes of technologies described herein. The communications unit 1303 is configured to support communication between the terminal 800 and other network entities, such as communication with a function module or network entity shown in FIG. 2 or FIG. 4 or FIG. 6.

When the network device is an access network, the network device 1300 can also implement the functions of the access network 900 shown in FIG. 4 or FIG. 6. The processing unit 1302 is configured to perform control and management on actions of the access network 900. For example, the processing unit 1302 is configured to support the access network 900 in performing operation 406 in FIG. 4 and operations 604 and 606 in FIG. 6, and/or is applied to other processes of technologies described herein. The communications unit 1303 is configured to support communication between the access network 900 and other network entities, such as communication with a function module or network entity shown in FIG. 4 or FIG. 6.

When the network device is an access network, the network device 1300 can also implement the functions of the access network 1000 shown in FIG. 2. The processing unit 1302 is configured to perform control and management on actions of the access network 1000. For example, the processing unit 1302 is configured to support the access network 1000 in performing operations 207 and 209 in FIG. 2, and/or is applied to other processes of technologies described herein. The communications unit 1303 is configured to support communication between the access network 1000 and other network entities, such as communication with a function module or network entity shown in FIG. 2.

When the network device is a core network, the network device 1300 can also implement the functions of the core network 1100 shown in FIG. 2 or FIG. 4. The processing unit 1302 is configured to perform control and management on actions of the core network 1100. For example, the processing unit 1302 is configured to support the core network 1100 in performing operation 210 in FIG. 2 and operation 407 in FIG. 4, and/or is applied to other processes of technologies described herein. The communications unit 1303 is configured to support communication between the core network 1100 and other network entities, such as communication with a function module or network entity shown in FIG. 2 or FIG. 4.

When the network device is a core network, the network device 1300 can also implement the functions of the core network 1200 shown in FIG. 6. The processing unit 1302 is configured to perform control and management on actions of the core network 1200. For example, the processing unit 1302 is configured to support the core network 1200 in performing operations 604 and 607 in FIG. 6, and/or is applied to other processes of technologies described herein. The communications unit 1303 is configured to support communication between the core network 1200 and other network entities, such as communication with a function module or network entity shown in FIG. 6.

The processing unit 1302 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in this disclosure. Alternatively, the processor may be a combination of processors implementing a computing function, for example, a combination of one or more microprocessors, or a combination of the DSP and a microprocessor. The communications unit 1303 may be a transceiver. The storage unit 1301 may be a memory.

Figure 14:
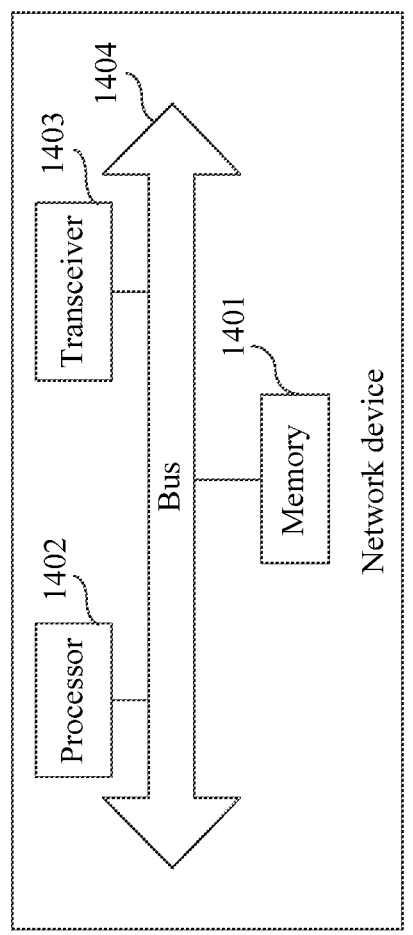
FIG. 14 is a schematic structural diagram of a network device according to another embodiment of this disclosure.

When the processing unit 1302 is a processor, the communications unit 1303 is a transceiver, and the storage unit 1301 is a memory, the network device according to the embodiments of this disclosure may be the network device shown in FIG. 14.

Referring to FIG. 14, the network device includes a processor 1402, a transceiver 1403, a memory 1401, and a bus 1404. The transceiver 1403, the processor 1402, and the memory 1401 are connected to each other through the bus 1404. The bus 1404 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

It should be noted that, when the terminal, the access network, the core network, the network device, or the network access system provided by the foregoing embodiments accesses a network, the division of the foregoing function modules is merely used as an example for description. In actual application, the foregoing functions may be allocated to and performed by different function modules as required. That is, the internal structures of the terminal, the access network, the core network, the network device, and the network access system are divided into different function modules to perform all or a part of the functions described above. In addition, the foregoing embodiments of the terminal, the access network, the core network, the network device, and the network access system are based on the same concept as the embodiments of the network access method. For a specific implementation process thereof, refer to the method embodiment, and details are not repeated herein again.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of this disclosure, but are not intended to limit this disclosure. Any modification, equivalent replacement, or improvement made without departing from the spirit and principle of this disclosure should fall within the protection scope of this disclosure.

What is claimed is:

1. A network access method, comprising:
obtaining a network service identifier of a requested network service;
obtaining access information based on the network service identifier, wherein the access information comprises a network slice identifier and a network slice type identifier that correspond to the network service identifier;
determining, based on the network slice type identifier, an access mode corresponding to a network slice type; and
accessing, based on the access mode corresponding to the network slice type, a network slice corresponding to the network slice identifier.

2. The method according to claim 1, wherein the determining, based on the network slice type identifier, an access mode corresponding to a network slice type comprises:
determining, based on the network slice type identifier, that the access mode corresponding to the network slice type is to access, through a dedicated access network and a dedicated core network, the network slice corresponding to the network slice identifier; or
determining, based on the network slice type identifier, that the access mode corresponding to the network slice type is to access, through a common access network and a dedicated core network, the network slice corresponding to the network slice identifier; or determining, based on the network slice type identifier, that the access mode corresponding to the network slice type is to access, through a common access network and a common core network, the network slice corresponding to the network slice identifier.

3. The method according to claim 2, wherein when the access mode is to access, through a dedicated access network and a dedicated core network, the network slice corresponding to the network slice identifier, the access information further comprises a dedicated access network identifier; and the accessing, based on the access mode corresponding to the network slice type, a network slice corresponding to the network slice identifier comprises:

receiving a broadcast message sent by at least one access network, wherein the broadcast message comprises an access network identifier;

determining, that the access network identifier is the same as the dedicated access network identifier;

sending a network connection request, wherein the network connection request comprises the dedicated access network identifier;

establishing a network connection to a dedicated access network corresponding to the dedicated access network identifier; and sending a network registration request to the dedicated access network, wherein the network registration request carries the network slice identifier and a user identifier, and the network registration request is used to request a first dedicated core network corresponding to the network slice identifier to perform network registration on a terminal based on the user identifier.

4. The method according to claim 2, wherein when the access mode is to access, through a common access network and a dedicated core network, the network slice corresponding to the network slice identifier, the accessing, based on the access mode corresponding to the network slice type, a network slice corresponding to the network slice identifier comprises:

establishing a network connection to a first common access network; and sending a network registration request to the first common access network, wherein the network registration request carries the network slice identifier and a user identifier, and the network registration request is used to request a second dedicated core network corresponding to the network slice identifier to perform network registration on a terminal based on the user identifier.

5. The method according to claim 2, wherein when the access mode is to access, through a common access network and a common core network, the network slice corresponding to the network slice identifier, the access information further comprises a network service type; and the accessing, based on the access mode corresponding to the network slice type, a network slice corresponding to the network slice identifier comprises:

establishing a network connection to a second common access network, and registering with the common core network;

determining a service request message; and sending the service request message to the common core network through the second common access network, wherein the service request message carries the network slice identifier, and the service request message is used to request access to the network slice corresponding to the network slice identifier.

6. The method according to claim 1, wherein the access information further comprises roaming indication information; and before the accessing, based on the access mode corresponding to the network slice type, a network slice corresponding to the network slice identifier, the method further comprises:

detecting a current network status; and performing, when the current network status is a roaming state and the roaming indication information is to allow the terminal to roam, or when the current network status is a non-roaming state, the operation of accessing, based on the access mode corresponding to the network slice type, a network slice corresponding to the network slice identifier.

7. A network access method, comprising:

establishing a network connection to a terminal;

receiving a network registration request sent by the terminal, wherein the network registration request comprises a network slice identifier and a user identifier;

determining a core network corresponding to the network slice identifier; and sending the network registration request to the core network, wherein the network registration request is used to request the core network to perform network registration on the terminal based on the user identifier, so that the terminal accesses a network slice corresponding to the network slice identifier.

8. The method according to claim 7, wherein the establishing a network connection to a terminal comprises:

sending a broadcast message to the terminal, wherein the broadcast message comprises an access network identifier;

receiving a network connection request sent by the terminal, wherein the network connection request comprises the access network identifier; and establishing the network connection to the terminal based on the network connection request.

9. The method according to claim 8, wherein the network connection request comprises the network slice identifier, and after the establishing the network connection to the terminal, the method further comprises:

configuring a network based on the network slice identifier, to provide a service corresponding to the network slice type to the terminal based on the configured network.

10. The method according to claim 7, wherein the determining a core network corresponding to the network slice identifier comprises:

sending a first query request to a slice selection function entity, wherein the first query request comprises the network slice identifier; and receiving a core network address corresponding to the network slice identifier and the core network address being sent by the slice selection function entity.

11. A terminal, comprising:

an identifier obtaining unit, configured to obtain a network service identifier of a requested network service;

an information obtaining unit, configured to obtain access information based on the network service identifier, wherein the access information comprises a network slice identifier and a network slice type identifier that correspond to the network service identifier;

a determining unit, configured to determine, based on the network slice type identifier, an access mode corresponding to a network slice type; and a network slice access unit, configured to access, based on the access mode corresponding to the network slice type, a network slice corresponding to the network slice identifier.

12. The terminal according to claim 11, wherein the determining unit is configured to determine, based on the network slice type identifier, that the access mode corresponding to the network slice type is to access, through a dedicated access network and a dedicated core network, the network slice corresponding to the network slice identifier; or the determining unit is configured to determine, based on the network slice type identifier, that the access mode corresponding to the network slice type is to access, through a common access network and a dedicated core network, the network slice corresponding to the network slice identifier; or the determining unit is configured to determine, based on the network slice type identifier, that the access mode corresponding to the network slice type is to access, through a common access network and a common core network, the network slice corresponding to the network slice identifier.

13. The terminal according to claim 12, wherein the access mode is to access, through a dedicated access network and a dedicated core network, the network slice corresponding to the network slice identifier, the access information further comprises a dedicated access network identifier; and the network slice access unit is configured to:

receive a broadcast message sent by at least one access network, wherein the broadcast message comprises an access network identifier;

determine that the access network identifier is the same as the dedicated access network identifier;

send a network connection request, wherein the network connection request comprises the dedicated access network identifier; establish a network connection to a dedicated access network corresponding to the dedicated access network identifier;

and send a network registration request to the dedicated access network, wherein the network registration request carries the network slice identifier and a user identifier, and the network registration request is used to request a first dedicated core network corresponding to the network slice identifier to perform network registration on the terminal based on the user identifier.

14. The terminal according to claim 12, wherein when the access mode is to access, through a common access network and a dedicated core network, the network slice corresponding to the network slice identifier, the network slice access unit is configured to: establish a network connection to a first common access network; and send a network registration request to the first common access network, wherein the network registration request carries the network slice identifier and a user identifier, and the network registration request is used to request a second dedicated core network corresponding to the network slice identifier to perform network registration on the terminal based on the user identifier.

15. The terminal according to claim 12, wherein when the access mode is to access, through a common access network and a common core network, the network slice corresponding to the network slice identifier, the access information further comprises a network service type; and the network slice access unit is configured to establish a network connection to a second common access network, and registering with the common core network; determine a service request message, and send the service request message to the common core network through the second common access network, wherein the service request message carries the network slice identifier, and the service request message is used to request access to the network slice corresponding to the network slice identifier.

16. The terminal according to claim 11, wherein the access information further comprises roaming indication information; and the terminal further comprises:

a detection unit, configured to detect a current network status; and the network slice access unit is configured to: when the current network status is a roaming state and the roaming indication information is to allow the terminal to roam, or when the current network status is a non-roaming state, access, based on the access mode corresponding to the network slice type, the network slice corresponding to the network slice identifier.

* * * * *